United States Patent
Tegzes et al.

(10) Patent No.: US 9,979,863 B2
(45) Date of Patent: May 22, 2018

(54) METHOD, SYSTEM AND COMPUTER READABLE MEDIUM FOR PROCESSING A MEDICAL VIDEO IMAGE

(71) Applicant: General Electric Company, Schenectady, NY (US)

(72) Inventors: Pál Tegzes, Budapest (HU); Bence Papp, Budapest (HU)

(73) Assignee: GENERAL ELECTRIC COMPANY, Schenectady, NY (US)

(*) Notice: Subject to any disclaimer, the term of this patent is extended or adjusted under 35 U.S.C. 154(b) by 295 days.

(21) Appl. No.: 13/866,643

(22) Filed: Apr. 19, 2013

(65) Prior Publication Data

US 2013/0278829 A1 Oct. 24, 2013

(51) Int. Cl.
| | | |
|---|---|---|
| *G06K 9/00* | (2006.01) | |
| *H04N 5/21* | (2006.01) | |
| *G06K 9/20* | (2006.01) | |
| *G06K 9/40* | (2006.01) | |
| *H04N 21/44* | (2011.01) | |
| *H04N 21/442* | (2011.01) | |

(52) U.S. Cl.
CPC ............ *H04N 5/21* (2013.01); *G06K 9/00744* (2013.01); *G06K 9/2054* (2013.01); *G06K 9/40* (2013.01); *H04N 21/44* (2013.01); *H04N 21/44218* (2013.01)

(58) Field of Classification Search
None
See application file for complete search history.

(56) References Cited

U.S. PATENT DOCUMENTS

| | | | | |
|---|---|---|---|---|
| 5,644,324 A | * | 7/1997 | Maguire, Jr. ...... | G02B 27/2264 345/8 |
| 6,027,216 A | * | 2/2000 | Guyton .................. | A61B 3/113 351/200 |
| 6,173,069 B1 | * | 1/2001 | Daly .................. | G06K 9/00228 375/E7.14 |
| 6,281,942 B1 | * | 8/2001 | Wang ...................... | H04N 5/21 348/606 |
| 6,389,169 B1 | * | 5/2002 | Stark ........................ | G06T 5/00 382/225 |

(Continued)

FOREIGN PATENT DOCUMENTS

| | | |
|---|---|---|
| WO | 2006056924 A1 | 6/2006 |
| WO | 2007144640 A1 | 12/2007 |

OTHER PUBLICATIONS

Toet, "Gaze directed displays as an enabling technology for attention aware systems", Computers in Human Behavior, vol. 22 No. 4, 2006, pp. 615-647.*

(Continued)

*Primary Examiner* — Matthew Bella
*Assistant Examiner* — Jose M Torres

(57) ABSTRACT

A method, as well as a system and a computer readable medium based on the method, for reducing perceived noise. The method comprises the steps of determining an area of interest in the image, the area of interest being determined in dependence of a foveal vision of a user, and applying a stronger noise filtering in a peripheral area of the image than in the area of interest, the peripheral area being outside the area of interest and corresponding to a peripheral vision of the user.

19 Claims, 3 Drawing Sheets

(56) References Cited

U.S. PATENT DOCUMENTS

| | | | | |
|---|---|---|---|---|
| 6,535,644 | B1* | 3/2003 | Kurapati | H04N 19/63 375/240.01 |
| 6,659,611 | B2* | 12/2003 | Amir | G06K 9/00604 351/210 |
| 6,717,578 | B1* | 4/2004 | Deering | G06T 11/001 345/428 |
| 6,907,143 | B2* | 6/2005 | Ferguson | G06T 5/001 382/261 |
| 7,034,892 | B2* | 4/2006 | Ojo | G06T 5/20 348/607 |
| 8,020,993 | B1* | 9/2011 | Fram | G06F 3/013 351/200 |
| 2002/0141614 | A1* | 10/2002 | Lin | G06F 3/013 382/103 |
| 2003/0067476 | A1* | 4/2003 | Miller | G06F 3/011 345/598 |
| 2003/0184561 | A1* | 10/2003 | Vorst | G09B 9/30 345/619 |
| 2005/0018881 | A1* | 1/2005 | Peker | G11B 27/005 382/107 |
| 2005/0018911 | A1* | 1/2005 | Deever | H04N 19/597 382/232 |
| 2010/0056274 | A1* | 3/2010 | Uusitalo | G02B 27/017 463/31 |
| 2011/0273621 | A1* | 11/2011 | Richardson et al. | 348/608 |
| 2011/0301447 | A1* | 12/2011 | Park | G06T 7/0016 600/407 |
| 2012/0007866 | A1* | 1/2012 | Tahan | G06F 19/321 345/428 |
| 2012/0063697 | A1* | 3/2012 | Han | G06T 5/004 382/255 |
| 2014/0153842 | A1* | 6/2014 | Pescatore | G06T 5/002 382/264 |
| 2014/0247277 | A1* | 9/2014 | Guenter | G06T 11/40 345/611 |

OTHER PUBLICATIONS

Zhang et al., "Real-time Foveation Filtering Using Nonlinear Mipmap Interpolation", The Visual Computer, Jun. 2010, vol. 26, Issue 6, pp. 923-932.*

Wang et al., "Foveated Image and Video Coding", Chapter 14 in Digital Video Image Quality and Perceptual Coding (H. R. Wu, and K. R. Rao, eds.), Marcel Dekker Series in Signal Processing and Communications, Nov. 2005, pp. 1-29.*

Lee et al., "Fast Algorithms for Foveated Video Processing", IEEE Transactions on Circuits and Systems for Video Technology, vol. 13, No. 2, Feb. 2003, pp. 149-162.*

B. Belanger, "Management of Pediatric Radiation Dose Using GE Fluoroscopic Equipment", Pediatr. Radiol. Suppl 2, vol. 36, pp. 204-211, 2006.

European Search Report and Written Opinion from EP Application No. 12462008.9 dated Sep. 19, 2012.

Schoonenberg, et al. "Adaptive spatial-temporal filtering applied to x-ray fluoroscopy angiography" Proceedings of SPIE. vol. 5744. Jan. 1, 2005 pp. 870-878.

Bismuth V. et al."A device enhancing and denoising algorithm for X-ray cardiac fluoroscopy". 19th International Conference on Pattern Recognition. 2008: ICPR 2008; Dec. 8-11, 2008. Tampa. Florida. USA. Piscataway. NJ. Dec. 8, 2008 pp. 1-4.

* cited by examiner

METHOD, SYSTEM AND COMPUTER READABLE MEDIUM FOR PROCESSING A MEDICAL VIDEO IMAGE

BACKGROUND OF THE INVENTION

The subject matter disclosed herein relates to a method, a system and a computer readable medium for processing a medical video image for reducing perceived noise. More particularly, the disclosed subject matter relates to image processing, and to systems and methods for location-selective medical image filtering capabilities.

Despite the emergence of powerful imaging modalities that do not use ionizing radiation, fluoroscopic X-ray systems continue to play a significant role in medical imaging, particularly for interventional procedures, where real-time imaging is very important. For pediatric patients, the consideration of lifetime radiation risk versus procedural benefit to the patient remains a fundamental consideration for the clinician. For a manufacturer of medical X-ray imaging equipment, it is critically important to exploit advances in X-ray component technologies, image processing, system design and advanced imaging techniques to provide the clinician with the appropriate imaging tools and controls to effectively perform procedures at the lowest possible total X-ray dose.

Since radiation dose has to be kept as low as reasonably achievable, quantum noise is an inherent property of fluoroscopy images. The presence of noise is disturbing for the user, making it more difficult to assess the position of interventional tools and characteristics of relevant anatomical information. It is possible to reduce noise by known image processing methods, but it is very difficult to do it without degrading medical information. Indeed, a doctor's human visual perception—utilizing a vast amount of a priori information about anatomy and tool motion—usually outperforms all algorithmic solutions to identify objects in the presence of noise. However, performing this task requires intense concentration, and in the long run it is very tiring for the doctor, and distracts his attention from the intervention he is performing.

Similar noise related problems arise in connection with other types of medical video imaging, e.g. in ultrasound techniques.

Significant efforts have been directed towards decreasing this burden on physicians, and to mitigate the disturbing noise by means of noise filtering. There are known noise filtering approaches, e.g. the so called FNR (fluoroscopic noise reduction), as described e.g. in Barry Belanger's and John Boudry's: Management of pediatric radiation dose using GE fluoroscopic equipment (Pediatr. Radiol., 2006 September; 36 (Suppl. 2) 204-211, Doi: 10.1007/s00247-006-0228-9, PMCID: PMC2663641).

However, no filtering technique is known which effectively reduces perceived noise while not degrading image quality.

Thus, there is a need for a solution allowing an improvement over existing methods and systems. There is a need for an image processing method, computer program and system eliminating as much of the shortcomings of known techniques as possible. There is a particular need for a method for processing a medical video image for reducing perceived noise while maintaining a highly informative image quality in an area of interest.

It has been recognized that the highly relevant medical information is usually focused in the center of the image perceived by the foveal vision of an interventionist, while a great part of the perceived noise is coming from the image edges, perceived by peripheral vision, which is more sensitive to temporal variations.

BRIEF DESCRIPTION OF THE INVENTION

In an embodiment, a method for processing a medical video image for reducing perceived noise is provided. The method comprising determining an area of interest in the image, the area of interest being determined in dependence of a foveal vision of a user; and applying a stronger noise filtering in a peripheral area of the image than in the area of interest, the peripheral area being outside the area of interest and corresponding to a peripheral vision of the user.

In an embodiment, a computer readable medium comprising a computer readable program is provided for processing a medical video image for reducing perceived noise, wherein the computer readable program when executed on a computer causes the computer to perform the above method.

In an embodiment, a system is provided for processing a medical video image for reducing perceived noise. The system comprises a determining unit for determining an area of interest in the image, the area of interest being determined in dependence of a foveal vision of a user; and a filtering unit applying a stronger noise filtering in a peripheral area of the image than in the area of interest, the peripheral area being outside the area of interest and corresponding to a peripheral vision of the user.

A selective image processing method, according to the subject matter disclosed herein is proposed to reduce perceived noise in fluoroscopy or other types of medical images, while not impacting the visibility of e.g. interventional tools or objects of interest. Selectivity means that a stronger noise filtering is applied to image edges than is applied to the center. Embodiments comprise temporal and spatial filtering with weights modulated according to a distance from the center of a region of interest.

BRIEF DESCRIPTION OF THE DRAWINGS

Characteristics, objectives and advantages of embodiments of the subject matter will become apparent from the following description, which is given solely by way of illustration and is non-limiting, and is to be read with reference to the appended drawings in which.

DETAILED DESCRIPTION OF THE INVENTION

Figure 2:
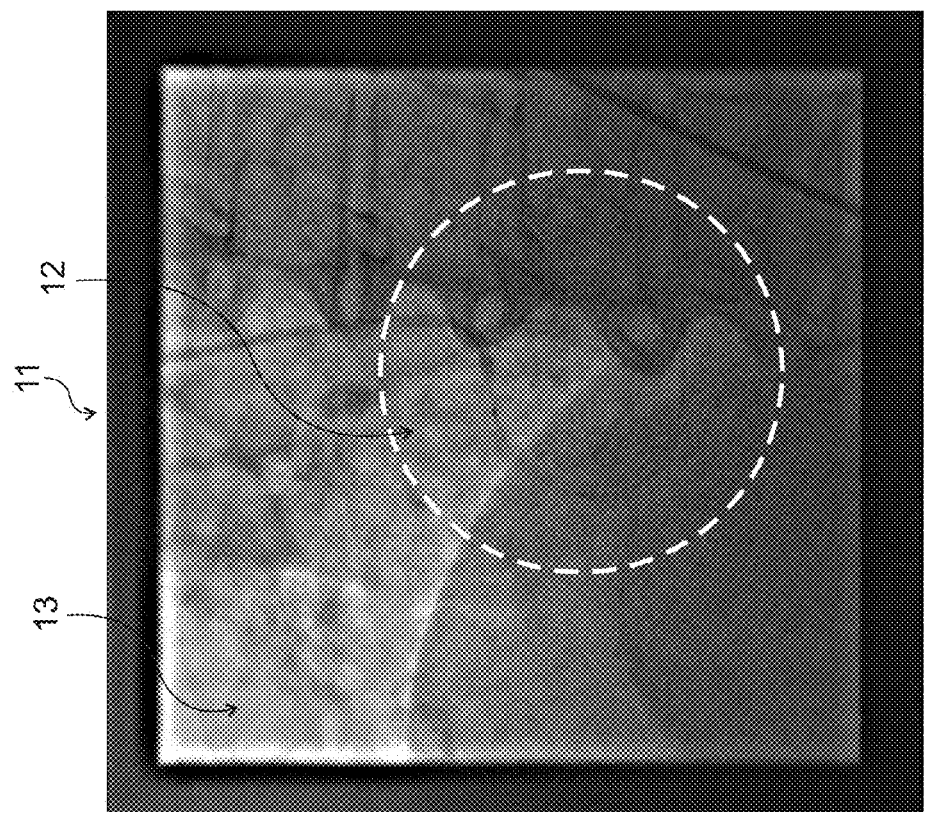
FIG. 2 shows an output image after image processing, also indicating an area of interest.

Embodiments of the invention may be in the form of computer-implemented processes and apparatuses for practicing those processes. Embodiments may also be in the form of a computer program code containing instructions embodied in tangible media, such as floppy diskettes, CD-ROMs, hard drives, or any other computer readable storage medium, wherein, when the computer program code is loaded into and executed by a computer, the computer becomes an apparatus for carrying out the method. Some embodiments may also be in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for carrying out the method. When implemented on a general-purpose microprocessor, the computer program code segments configure the microprocessor to create specific logic circuits.

Furthermore, embodiments of the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Embodiments of the invention can be an entirely hardware embodiment, an entirely software embodiment or an embodiment including both hardware and software elements. Some embodiments of the present invention are implemented in software, which includes but is not limited to firmware, resident software, microcode, etc.

The subject matter disclosed herein describes a method for processing a medical video image for reducing perceived noise. The method comprises determining an area of interest in the image, the area of interest being determined in dependence of a foveal vision of a user; and applying a stronger noise filtering in a peripheral area of the image than in the area of interest, the peripheral area being outside the area of interest and corresponding to a peripheral vision of the user.

When inspecting a medical video image obtained by fluoroscopy, ultrasound or other noisy medical imaging, a doctor usually focuses on an object or area of interest and is continuously extracting information from the noisy background. In many cases the object of interest is located in the center of the image. The doctor perceives the object near his center of gaze (foveal vision), which is a region efficient in distinguishing color and shape. At the same time, the doctor also perceives the image edges with her/his peripheral vision. Since peripheral vision is more sensitive to flicker, motion, or other temporal variations, and is less sensitive to objects, thus the image edges become the source of significant perceived noise, while they include only limited amount of relevant clinical information.

The subject matter disclosed herein proposes to selectively modulate the intensity of noise filtering to ensure a stronger noise reduction around the image edges than in the area of interest. Any type of noise reduction method that can be applied to sub-regions of the image or has at least one adjustable parameter may be used.

According to the subject matter disclosed herein, areas of the image are effectively utilized which are less important than the area or center of interest but are still needed during a medical intervention for the doctor.

An embodiment of the present invention is a method where the determining process comprises determining a center of the area of interest, wherein the area of interest is located around the center.

The determining of the area of interest can be carried out on the basis of tracking an activity. By way of examples, the activity can be an eye motion of the user observing the image, or a manipulation or moving of a medical device that can be detected in the image by image recognition. The image part looked at is often sharp and of a high-contrast, while the rest of the image gets smooth and noiseless.

In an embodiment of the present invention, which is a method, the area of interest is determined on the basis of a user input, e.g. by means of a mouse click or user selection on a particular point of the image. Alternatively, the area of interest can be determined by means of image recognition, by detecting a predetermined object of interest in the image.

Figure 1:
FIG. 1 illustrates an input image before image processing.

FIG. 1 shows an input image 10 before image processing according to an embodiment the present invention, wherein the image is a medical video image obtained by fluoroscopy; while FIG. 2 shows an output image 11 after image processing according to an embodiment the present invention. It can be observed that the image quality in an area of interest 12, the boundary of which is indicated only for explanation purposes by means of a dashed circle, is not deteriorated by a stronger noise filtering applied to a peripheral area 13 of the image. In the context of the present application 'stronger filtering' means a more intense noise suppression sufficient to smooth the image and suppress flicker, motion or other temporal variations resulting from the noise.

The location-selective or inhomogeneous filtering of the image results in a substantial reduction of perceived noise, which can be observed by visually comparing FIG. 1 and FIG. 2. It is to be noted that the reduction of perceived noise is much more apparent when a processed medical video image flow is observed.

Figure 3:
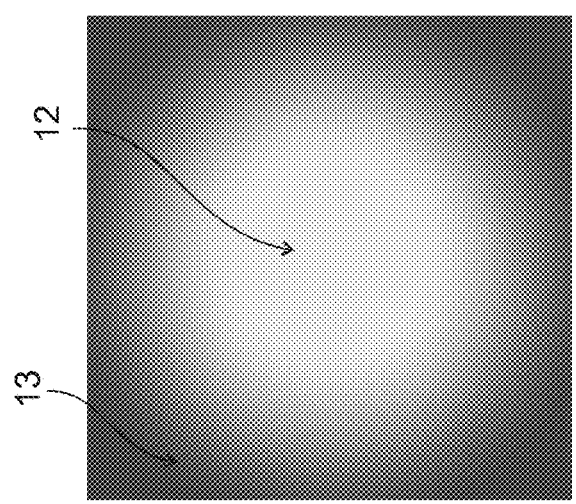
FIG. 3 schematically illustrates a mask of a selective noise filtering.

FIG. 3 schematically shows a mask of a selective image filtering according at least one embodiment of the subject matter disclosed herein. The shade level of the schematic mask depicts the strength of the noise filtering: the darker the mask, the stronger the noise filtering. It can be seen that the area of interest 12 does not have a sharp boundary, but there is a smooth transition between the area of interest 12 and the peripheral area 13.

Figure 4:
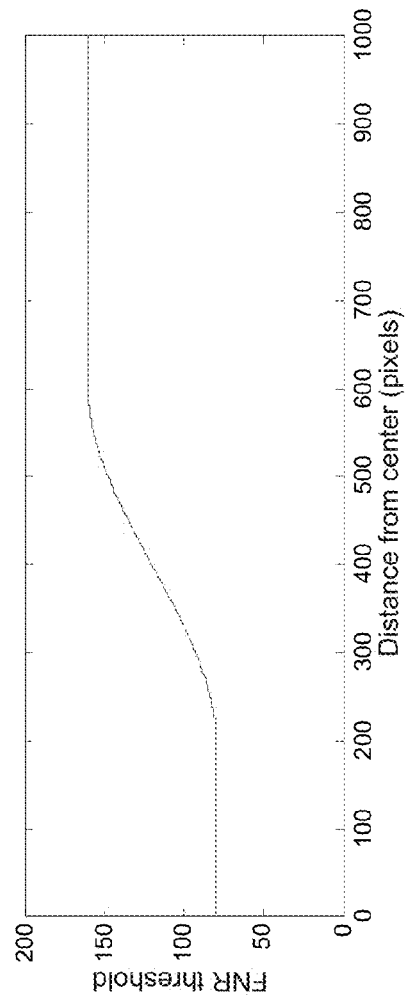
FIG. 4 shows a diagram of a filtering parameter as a function of the location within the image.
Figure 5:
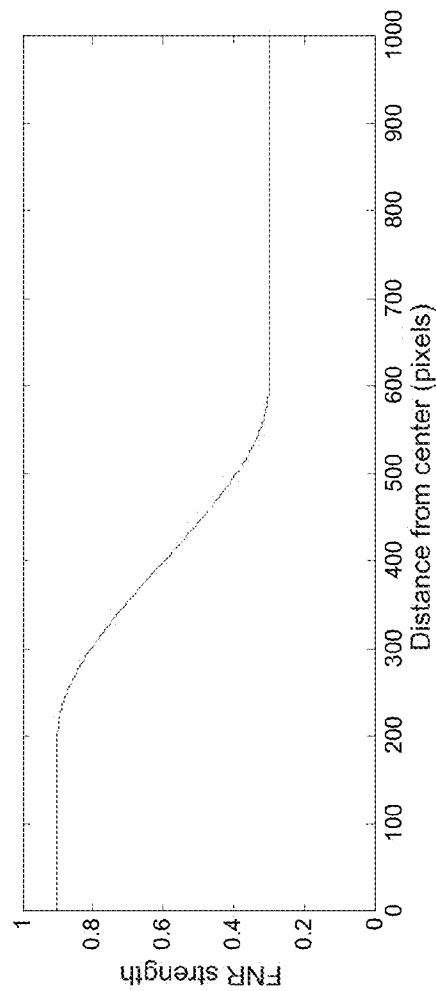
FIG. 5 shows a diagram of another filtering parameter as a function of the location within the image.

In an embodiment of the present invention, a noise filtering algorithm is applied in the image with at least one or more parameter(s) varying in dependence of a location within the image. The single algorithm is applied to the whole image, but with different parameter settings in each sub-region. The parameter values are adjusted according to a given weight function depending on the location of the sub-region compared to the area or object of interest. An example of such an algorithm can be the FNR algorithm that performs a temporal weighted averaging of individual pixels at a given location over consecutive frames, the weights being determined by weight and threshold parameters. The diagram of the weight parameter as a function of the distance is shown in FIG. 4, while the threshold parameter as a function of the distance is shown in FIG. 5. An example of parameter weighting can be that the center of interest falls in the center of the image, and parameter weighting depends only on the geometrical distance (R) of the processed pixel from this center. For example, if R is smaller than a given radius R1, a weak filtering is applied; and if R is larger than another radius R2, a strong filtering is applied. A smooth interpolation is preferably applied between the two radiuses, using a scaled and shifted version of a smoothstep function known per se:

$f(R)=3R^2-2R^3$.

Besides FNR, several other image processing algorithms can be envisioned. In an embodiment of the present invention, a weighted average of two filter algorithms are applied in the image, wherein a smoothing first algorithm and a second algorithm with a smoothing weaker than the first algorithm or an algorithm in which edge enhancement is used, and wherein a weight of averaging the two filter algorithms is determined in dependence of a location within the image. The first algorithm and the second algorithm can be convolution algorithms. The strong smoothing filter is defined for the edge areas, and a weak smoothing, or even edge enhancement, is defined for the center. The filter applied on a given region of the image can be a weighted average of the two filters, the weight depending of the location within the image.

Figure 8:
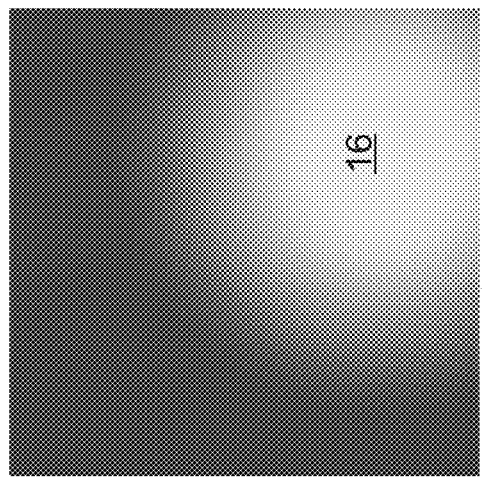
FIG. 8 schematically illustrates a further mask of a selective noise filtering.
Figure 7:
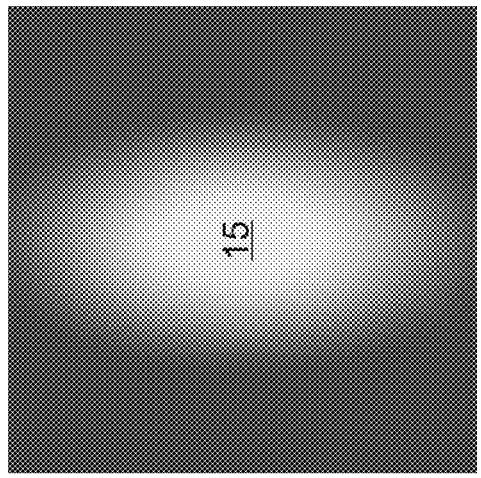
FIG. 7 schematically illustrates a further mask of a selective noise filtering.
Figure 6:
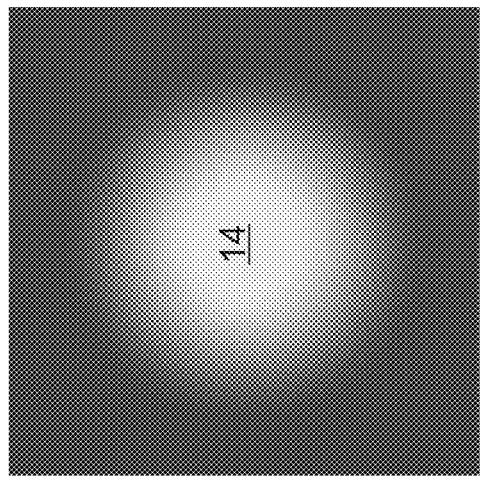
FIG. 6 schematically illustrates another mask of a selective noise filtering.

Other parameter dependent functions can also be envisioned. The size of the area of weak noise reduction may vary according to the image content, the size of the display device, and the viewing distance. In an embodiment of the present invention, the area of interest 12 has a rounded shape as indicated in FIG. 3. The mask according to FIG. 6 also indicates a rounded area of interest 14 covering a smaller part of the image. If the object of interest has a first characteristic size being significantly larger than a second characteristic size, then an elliptical area of interest can be considered, and then the weights will depend on $(x/a)^2+(y/b)^2$, where x and y are the distance of a pixel from the center of the point of interest, and a and b are predefined distances. A mask according to such an area of interest 15 is shown in FIG. 7. The object of interest is not necessarily located in the center of the image, as depicted by the mask in FIG. 8, where the area of interest 16 is next to a corner of the image. In this case the distance is to be measured from this center of interest, not the image center.

In an embodiment of the present invention, a computer readable medium comprising a computer readable program for automatic segmentation of a medical image is provided, wherein the computer readable program when executed on a computer causes the computer to perform the steps of the above described method.

An embodiment of the present invention is a system for processing a medical video image for reducing perceived noise comprising a determining unit for determining an area of interest in the image, the area of interest being determined in dependence of a foveal vision of a user. The system further comprises a filtering unit applying a stronger noise filtering in a peripheral area of the image than in the area of interest, the peripheral area being outside the area of interest and corresponding to a peripheral vision of the user.

The determining unit and filtering unit can take the form of hardware, software or combinations thereof.

At least one technical advantage of the subject matter disclosed herein is that it enables simple and easy implementation and significantly improves the perceived image quality. The method decreases noise in the edge of the medical, e.g. fluoroscopic images, which is tiring for the interventionist, without compromising the visibility of objects in the image center. This results in a more concentrated and shorter application of medical video imaging, meaning a reduced total radiation dose.

The subject matter disclosed herein can be used for both real-time and recorded video images.

This written description uses examples to disclose the embodiments and aspects of the invention, including the best mode, and also to enable any person skilled in the art to practice the embodiments and aspects of the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for processing a medical video image for reducing perceived noise,
   the method comprising:
      determining an area of interest in the medical video image, the area of interest being determined in dependence of a foveal vision of a user; and
      applying a stronger noise filtering in a peripheral area of the medical video image than in the area of interest, the peripheral area being outside the area of interest and corresponding to a peripheral vision of the user, wherein applying the stronger noise filtering comprises applying a noise reduction filter mask to the peripheral area of the medical video image around the area of interest that reduces high frequency temporal content and spatial information content of the peripheral area;
   wherein applying the stronger noise filtering further comprises applying a noise filtering algorithm in the image, wherein the algorithm comprises a temporal weighted averaging of individual pixels over consecutive frames of the image with weights determined by weight parameters that decrease as a distance from a center of the area of interest increases and threshold parameters that increase as the distance from the center of the area of interest increases.

2. The method according to claim 1, wherein the determining step comprises determining a center of the area of interest, the area of interest being located around the center.

3. The method according to claim 1, further comprising determining the area of interest on the basis of tracking an activity.

4. The method according to claim 3, further comprising tracking an eye motion of the user.

5. The method according to claim 3, further comprising tracking a manipulated medical device in the image.

6. The method according to claim 1, further comprising determining the area of interest on the basis of a user input.

7. The method according to claim 1, further comprising determining the area of interest by image recognition, in accordance with an object of interest in the image.

8. The method according to claim 1, wherein the area of interest has a rounded or an elliptical shape.

9. The method according to claim 1, further comprising a noise filtering algorithm applied in the image with at least one parameter varying in dependence of a location within the image.

10. The method according to claim 9, further comprising varying at least one parameter in dependence of a distance from the area of interest or from a center thereof.

11. The method according to claim 1, further comprising applying a weighted average of two filter algorithms in the image, wherein a smoothing first algorithm and a second algorithm with a smoothing weaker than the first algorithm or with edge enhancement are used, and wherein a weight of averaging the two filter algorithms is determined in dependence of a location within the image.

12. The method according to claim 11, wherein the first algorithm and the second algorithm are convolution algorithms.

13. The method of claim 1, wherein applying the noise reduction filter mask comprises applying a more intense noise suppression sufficient to smooth the peripheral area of the image and suppress flicker, motion or other temporal variations resulting from noise in the peripheral area of the image.

14. The method of claim 1, comprising applying a noise filtering algorithm to the image that determines a distance between an image pixel to be processed and a center of the area of interest of the image, wherein the stronger noise filtering is applied to the image pixel to be processed when the determined distance is greater than a pre-defined distance from the center of the area of interest.

15. The method of claim 14, comprising applying a weak filtering to the image pixel when the determined distance is less than another pre-defined distance from the center of the area of interest.

16. The method of claim 15, comprising applying a smooth interpolation to an area defined by the pre-defined distance from the center of the area of interest and the another pre-defined distance.

17. A non-transitory computer readable medium comprising a computer readable program for processing a medical video image for reducing perceived noise, wherein the computer readable program when executed on a computer causes the computer to perform the method of processing the medical video image for reducing perceived noise according to claim 1.

18. A system for processing a medical video image for reducing perceived noise, the system comprising:
   a determining unit for determining an area of interest in the medical video image, the area of interest being determined in dependence of a foveal vision of a user; and
   a filtering unit applying a stronger noise filtering in a peripheral area of the image than in the area of interest, the peripheral area being outside the area of interest and corresponding to a peripheral vision of the user, wherein the filtering unit comprises a noise reduction filter mask that is used to apply the stronger noise filtering, the noise reduction filter mask configured to reduce a high frequency temporal content and spatial information content of the peripheral area;
   wherein the filtering unit is configured to apply the stronger noise filtering by applying a noise filtering algorithm in the image, the algorithm comprising a temporal weighted averaging of individual pixels over consecutive frames of the image with weights determined by weight parameters that decrease as a distance from a center of the area of interest increases and threshold parameters that increase as the distance from the center of the area of interest increases.

19. The system of claim 18, wherein the noise reduction filter mask comprises temporal and spatial filtering with weights modulated according to a distance of a pixel to be filtered from a center of the area of interest, wherein the noise reduction filter mask comprises:
   a weak filter when the distance of the pixel to be filtered is less than a first pre-defined distance from the center of the area of interest;
   the stronger noise filtering when the distance of the pixel to be filtered is greater than a second pre-defined distance from the center of the area of interest; and
   a smooth interpolation filtering when the distance of the pixel to be filter is between the first pre-defined distance and the second pre-defined distance.

* * * * *